(12) United States Patent
Wu et al.

(10) Patent No.: US 7,535,557 B2
(45) Date of Patent: May 19, 2009

(54) LENS MEASURING METHOD AND DEVICE FOR DETERMINING DECENTER AND TILT OF THE LENS

(75) Inventors: Wen-Hong Wu, Hsinchu (TW); Kuo-Cheng Huang, Hsinchu (TW); Chien-Shing Lee, Hsinchu (TW); Jung-Ru Yu, Hsinchu (TW)

(73) Assignee: Instrument Technology Research Center, Hsinchu (TW)

( * ) Notice: Subject to any disclaimer, the term of this patent is extended or adjusted under 35 U.S.C. 154(b) by 288 days.

(21) Appl. No.: 11/513,601

(22) Filed: Aug. 31, 2006

(65) Prior Publication Data

US 2007/0201037 A1 Aug. 30, 2007

(30) Foreign Application Priority Data

Sep. 6, 2005 (TW) ............................... 94130616 A

(51) Int. Cl.
*G01B 9/00* (2006.01)
*G01B 11/02* (2006.01)

(52) U.S. Cl. ..................................... 356/127; 356/512

(58) Field of Classification Search ................. 356/124, 356/127, 508, 510–512; 359/827
See application file for complete search history.

(56) References Cited

U.S. PATENT DOCUMENTS

| | | | | |
|---|---|---|---|---|
| 2,478,609 A * | 8/1949 | Townsley | ..................... | 356/127 |
| 2,803,986 A * | 8/1957 | Choiniere et al. | ........... | 359/503 |
| 3,758,217 A * | 9/1973 | Stokstad | ..................... | 356/256 |
| 3,762,821 A * | 10/1973 | Bruning et al. | ........ | 356/139.07 |
| 4,537,473 A * | 8/1985 | Maschmeyer | ................ | 356/513 |
| 5,076,689 A * | 12/1991 | Adachi | ........................ | 356/127 |
| 5,187,539 A * | 2/1993 | Adachi et al. | ................ | 356/124 |
| 5,530,547 A * | 6/1996 | Arnold | ......................... | 356/458 |
| 5,548,396 A * | 8/1996 | Morita et al. | ................ | 356/127 |
| 5,675,413 A * | 10/1997 | Prikryl et al. | ............... | 356/508 |
| 5,844,670 A * | 12/1998 | Morita et al. | ................ | 356/124 |
| 5,917,599 A * | 6/1999 | Nishikawa et al. | .......... | 356/510 |
| 5,991,034 A * | 11/1999 | Ohtsuka | ...................... | 356/511 |
| 6,072,569 A * | 6/2000 | Bowen | ........................ | 356/124 |
| 6,072,570 A * | 6/2000 | Chipman et al. | ............ | 356/124 |
| 6,184,994 B1 * | 2/2001 | Freischlad | ................... | 356/511 |
| 6,504,615 B1 * | 1/2003 | Abe et al. | .................... | 356/511 |
| 6,734,979 B2 * | 5/2004 | Evans et al. | ................. | 356/512 |
| 6,781,700 B2 * | 8/2004 | Kuchel | ........................ | 356/513 |
| 6,947,149 B2 * | 9/2005 | Kobayashi et al. | .......... | 356/496 |
| 7,072,042 B2 * | 7/2006 | Kim et al. | ................... | 356/458 |
| 7,307,708 B2 * | 12/2007 | Murata | ........................ | 356/127 |
| 7,405,833 B2 * | 7/2008 | Smythe et al. | .............. | 356/514 |

\* cited by examiner

*Primary Examiner*—Patrick J Connolly
*Assistant Examiner*—Scott M Richey

(57) ABSTRACT

A device for measuring a lens, comprising a first interferometer having a first optical axis and carried on a first adjustment base, a lens holder for holding the lens having a first surface having a first lens optical axis and a second surface having a second lens optical axis, and a platen having a sliding rail and carrying the first adjustment base and the lens holder thereon, wherein the lens holder is movable on the sliding rail, wherein each of the first adjustment base and the lens holder has a tetra-axis adjustment mechanism through which a relative positional relationship of the first optical axis of the first interferometer and the first lens optical axis of the first surface of the lens is adjustable.

16 Claims, 13 Drawing Sheets

LENS MEASURING METHOD AND DEVICE FOR DETERMINING DECENTER AND TILT OF THE LENS

FIELD OF THE INVENTION

The present invention relates to a technology for measuring a lens, and more particular to a technology for measuring decenter and tilt amounts of a lens by an interferometer.

BACKGROUND OF THE INVENTION

For the recent years, the vigorous development of the electro-optic industry, particularly the digital camera and the cellular phone camera, has placed a larger and larger demand for the optical devices. Of the optical elements, the optical lens can be the most essential and important one. In terms of the product characteristics, the optical lens may be categorized into a refractive device (e.g. a lens and a prism), a reflective device, a diffractive device, a hybrid device, among others, which are each related to a specific material and manufacturing process. Among the optical lens, the aspherical optical devices have found more and more applications and are more and more required. This is because the aspherical lens can have a good imaging quality as compared to the spherical lens. Further, when the aspherical optical device is applied to an optical system, the number of the optical device required and the overall cost for the system may be reduced.

For the manufacturing reason, the aspherical lens is prone to a decenter or tilt issue with respect to the optical axes of its two side surfaces, leading to a deviation of the optical characteristics thereof. To obviate the deficient lens products, whether the decenter and tilt issues existing on the two axes of the aspherical lens are required to be measured or inspected, so that the lens itself can be corrected in optical design or manufacturing. In this regard, how to precisely and rapidly measure the aspherical lens is apparently an important issue to the manufacturing and design of the aspherical lens.

For the spherical lens, the optical axis is a line connecting the both curvature centers of the two side surfaces thereof, which is shown in FIG. 7A. For the lens with only a single spherical surface, all lines extending from the curvature center to the spherical surface can be taken as the optical axis, which is shown in FIG. 7B. For the spherical lens, the optical axis is a common line among the optical axes of the two side surfaces and thus the line connected between the two spherical curvature centers. In the spherical lens, the decenter and tilt issues do not exist between the two optical axes but only exists between the optical axes and the geometrical centerlines, which is shown in FIG. 7C. This is conventionally measured by a collimator. In the aspherical lens, a line formed by connecting the curvature centers of all the curvatures of the spherical surfaces is the optical axis and only this optical axis exists therein, which is shown in FIG. 7D. Thus, the aspherical lens is provided with an optical axis at each of the two side surfaces thereof. The two optical axes possibly do not coincide with each other due to the manufacturing error problem. Accordingly, the decenter and tilt issues exist between the two optical axes, which are shown in FIG. 7E. This is generally measured by a reflective collimator. However, the aspherical lens is mostly formed by glass molding or plastic injection and thus burrs and mouse bites might be found at the rim portion thereof, which can cause a disturbance for the rotation of the lens, required when being measured by a collimator, or an error with respect to the measurement.

In view of the above, there is a need to provide a method and device for measuring the decenter and tilt amounts between the two side surfaces of the lens by using an interferometer. After a long intensive series of experiments and research, the inventor finally sets forth such method and device. As compared to the prior art, the method and device of the present invention may not only be used for the spherical lens but also for the aspherical lens, and the optical lens may be precisely and rapidly measured.

SUMMARY OF THE INVENTION

It is, therefore, an object of the present invention to provide a device for measuring a lens, comprising a first interferometer having a first optical axis and carried on a first adjustment base, a lens holder for holding the lens having a first surface having a first lens optical axis and a second surface having a second lens optical axis, and a platen having a sliding rail and carrying the first adjustment base and the lens holder thereon, wherein the lens holder is movable on the sliding rail, wherein each of the first adjustment base and the lens holder has a tetra-axis adjustment mechanism through which a relative positional relationship of the first optical axis of the first interferometer and the first lens optical axis of the first surface of the lens is adjustable.

In an embodiment, the tetra-axis adjustment mechanism comprises two translation axes and two rotation axes.

In an embodiment, the lens holder has a 180 degrees overturn mechanism through which the first and second lens optical axes of the first and second surfaces are calibrated in turn with respect to the first optical axis of the first interferometer.

In an embodiment, the device further comprises a second interferometer having a second optical axis and disposed on a second adjustment base on the platen to measure a relative positional relationship of the second lens optical axis of the second surface and the second optical axis of the second interferometer.

In an embodiment, the device is used to measure a decenter and a tilt of the lens.

It is another object of the present invention to provide a method for measuring a decenter amount and a tilt amount of a lens, comprising the steps of providing an interferometer having an optical axis and the lens, wherein the lens has a first lens optical axis and a second lens optical axis, arranging the optical axis of the interferometer and the first lens optical axis of the first surface into having a first specific relative positional relationship therebetween, rotating the lens by 180 degrees, adjusting the second optical axis of the lens and the optical axis of the interferometer into having a second specific relationship therebetween and recording a first adjusted translation amount $\Delta y$, a second adjusted translation amount $\Delta z$, a first adjusted angular amount $\Delta \theta_y$ and a second adjusted angular amount $\Delta \theta_z$ required to be adjusted, and calculating the respective one of the decenter amount $\delta$ and the tilt amount $\Delta \theta$ existing between the first and second lens optical axes according to the first and second adjusted translation amounts $\Delta y$ and $\Delta z$ and the first and second adjusted angular amounts $\Delta \theta_y$ and $\Delta \theta_z$.

In an embodiment, each of the first and second specific relationships is a relationship where the optical axis of the interferometer and the first and second lens optical axes of the first and second surfaces totally coincide with each other.

In an embodiment, the optical axis of the interferometer and the first and second lens optical axes of the first and second surfaces are adjusted to totally coincide with one another by observing the formed interferogram of each surface of the lens.

In an embodiment, a distance between the surface of lens and the interferometer is adjusted to present the interfering fringes of the interferogram of the each surface of lens.

In an embodiment, the optical axis of the interferometer and the first and second lens optical axes of the lens are adjusted to totally coincide with one another by observing whether the interfering fringes are formed as concentric rings and whether the concentric rings are positioned at a center of the interferogram.

In an embodiment, the first and second specific relationships are identical to each other.

In accordance with an aspect of the present invention, a method for measuring a decenter amount and a tilt amount of a lens is disclosed, which comprises the steps of providing a first interferometer having a first optical axis, a second interferometer having a second optical axis and the lens, wherein the lens has a first surface having a first lens optical axis and a second surface having a second lens optical axis, and the first and second interferometers face the first and second surfaces of the lens respectively, adjusting the first interferometer and the lens so that the first lens optical axis of the first surface and the first optical axis of the first interferometer have a first specific relative positional relationship therebetween, adjusting the second lens optical axis of the second surface of the lens and the second optical axis of the second interferometer into having a second specific relative positional relationship therebetween and recording a first adjusted translation amount $\Delta y$, a second adjusted translation amount $\Delta z$, a first adjusted angular amount $\Delta\theta_y$ and a second adjusted angular amount $\Delta\theta_z$, and calculating the decenter amount $\delta$ and the tilt amount $\Delta\theta$ existing between the first and second lens optical axes of the first and second surfaces according to the first and second specific relative positional relationships and the first and second adjusted translation amounts $\Delta y$ and $\Delta z$ and the first and second adjusted angular amounts $\Delta\theta_y$ and $\Delta\theta_z$.

In an embodiment, each of the first and second specific relationships is a relationship where the first and second optical axes of the first and second interferometers and the first and second lens optical axes of the first and second surfaces totally coincide with one another.

In an embodiment, the optical axes of the first and second interferometers and the first and second lens optical axes of the first and second surfaces are adjusted to totally coincide with one another by observing the formed interferogram of each surface of the lens.

In an embodiment, a first distance between the first surface of the lens and the first interferometer and a second distance between the second surface of the lens and the second interferometer are adjusted respectively to present the interfering fringes of the interferogram of the each surface of lens.

In an embodiment, the optical axes of the first and second interferometers and the first and second lens optical axes of the first and second surfaces are adjusted to totally coincide with one another by observing whether the interfering fringes are formed as concentric rings and whether the concentric rings are positioned at a center of the interferogram.

In an embodiment, the first and second specific relationships are identical to each other.

Other objects, features and efficacies will be further understood when the following description is read with reference to the accompanying drawings.

BRIEF DESCRIPTION OF THE DRAWINGS

The above contents and the advantages of the present invention will become more readily apparent to those ordinarily skilled in the art after reviewing the following detailed descriptions and accompanying drawings, in which.

DETAILED DESCRIPTION OF THE PREFERRED EMBODIMENT

The present invention discloses a lens measuring method and device for determining decenter and tilt amounts of a lens, which will now be described more specifically by way of the following embodiments with reference to the annexed drawings. It is to be noted that the following descriptions of preferred embodiments of this invention are presented herein for purposes of illustration and description only; it is not intended to be exhaustive or to be limited to the precise form disclosed.

Figure 1A:
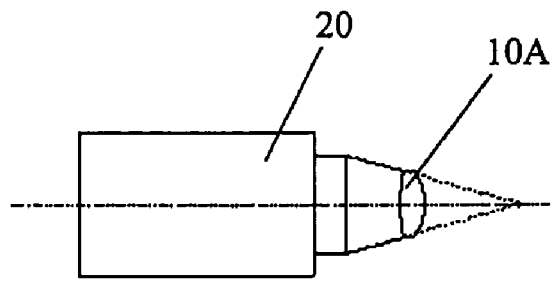
FIGS. 1A and 1B are each a diagram of an arrangement of a combination of a lens of a specific type and an interferometer when the lens is measured by the interferometer according to an embodiment of the present invention.
Figure 1B:
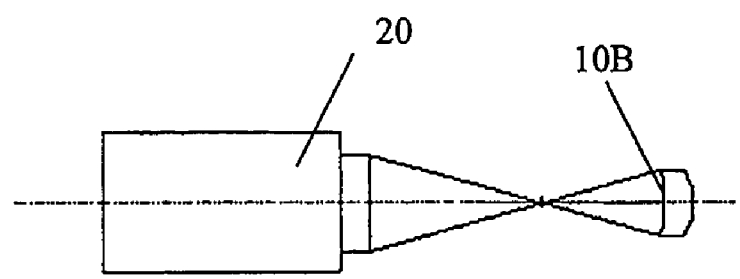

Referring to FIGS. 1 and 2, which are each a diagram of an arrangement of a combination of a lens of a specific type and an interferometer when the lens is measured by the interferometer according to an embodiment of the present invention. As shown, when the lens 10A to be measured is a convex lens, the lens 10A has to be placed within a focus range of the interferometer 20 so that interfering bands can be generated on the lens 10A. In the case of a concave lens, the lens 10B has to be placed outside the focus range of the interferometer 20 so that the corresponding interfering bands can be generated on the lens 10B. Namely, each of the lenses 10A, 10B has to be placed at a proper position (the position shown in FIGS. 1A and the position shown in FIG. 1B, respectively) with respect to the interferometer 20 so that the interfering bands can be generated as a reference for the measurement scheme in this invention for the lens 10A, 10B.

Figure 2A:
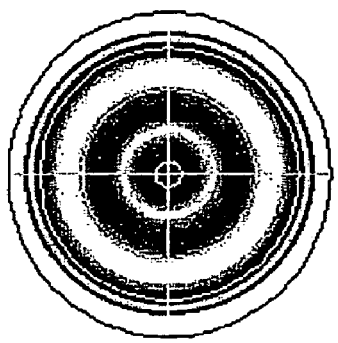
FIGS. 2A through 2D are diagrams illustrating how to obtain a relationship of optical axes of the lens and an optical axis of the interferometer according to the present invention.
Figure 2B:
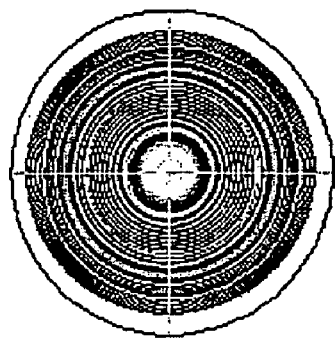
Figure 2C:
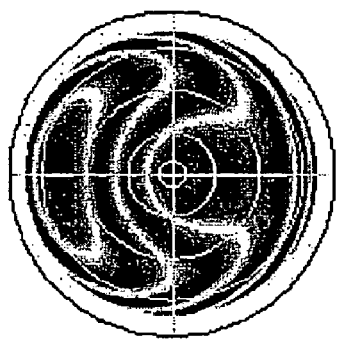
Figure 2D:
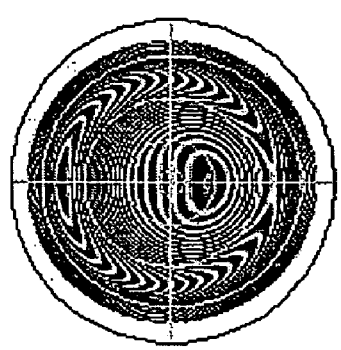

Referring to FIGS. 2A through 2D, which are diagrams illustrating how to obtain a relationship of optical axes of the lens and an optical axis of the interferometer according to the present invention. When an optical axis of one of the two surfaces of the lens coincides with an optical axis of the interferometer, the interfering fringes shown in FIG. 2A, where a spherical lens is used, and FIG. 2B, where a aspherical lens is used, and which are arranged as concentric circles with a center thereof located central to the interferogram. FIG. 2C is a diagram of interfering fringes obtained when decenter or tilt is presented between the optical axes of the spherical lens and the interferometer. FIG. 2D is a diagram of interfering fringes obtained when decenter or tilt is presented between the optical axes of the aspherical lens and the interferometer.

It may be known from the above description that a relationship of the optical axes of the lens and the optical axis of the interferometer can be obtained by observing the interfering fringes of the surface of lens. Therefore, the decenter and tilt amounts of the lens can be respectively known by finding a difference between the decenter and tilt amounts of the two optical axes of the lens with respect to the optical axis of the interferometer, respectively.

Figure 3:
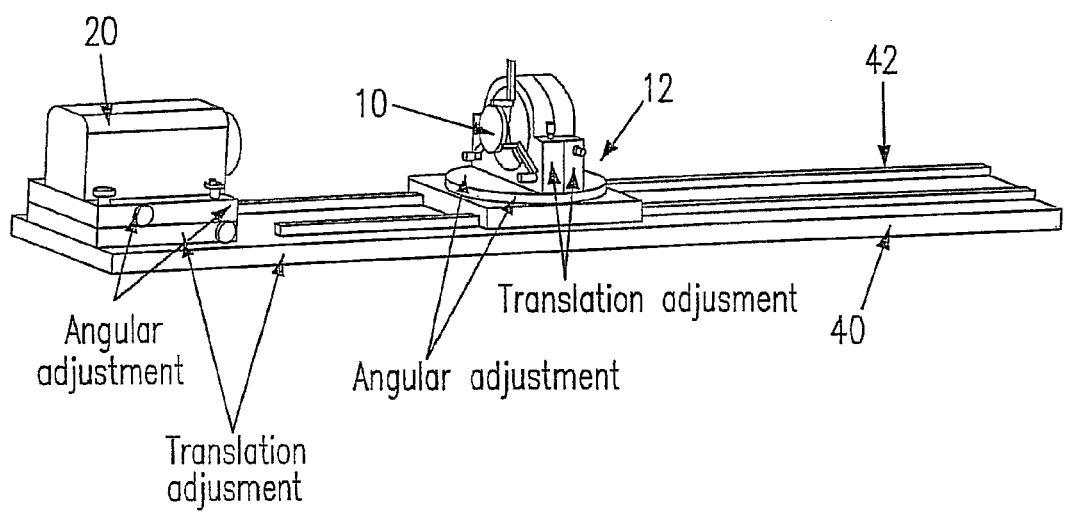
FIG. 3 is a diagram of a lens measuring device with a single interferometer according to a first embodiment of the present invention.

The following will be dedicated to the lens measuring device according to the present invention. FIG. 3 shows a lens measuring device with a single interferometer according to a first embodiment of the present invention. The lens measuring device 100 comprises an interferometer 20, a lens 10 to be measured and a platen 40. The interferometer 20 is mounted on an adjustment base 22 on the platen 40. The lens is mounted on the platen 40 through a lens holder 12. On the platen 40, there is also a sliding rail 42 through which the lens holder 12 is movable along a straight line on the platen 40. To make it possible to measure the two surfaces of the lens 10 by the interferometer 20, the lens holder 12 is designed to have a 180 degrees overturn mechanism so that the two optical axes of the lens 10 can be aligned with respect to the optical axis of the interferometer 20. In addition, to make it possible to obtain the decenter and tilt amounts of the lens by comparing the optical axis of the interferometer 20 and the optical axes of the lens 10, each of the adjustment base 22 and the lens holder 12 is provided with a tetra-axis adjustment mechanism (not shown) so that the optical axes of the lens 10 and the interferometer 20 may be adjusted when required. In operation, one of the tetra-adjustment mechanisms may be used to adjust the adjustment base 22 or the lens holder 12 in four directions, including two translational directions and two rotative directions. When the direction of the sliding rail 42 is defined as X-axis in three dimensional space, the two translational directions are Y-axis and Z-axis directions. Thus, the relationship of the optical axis of the interferometer 20 and the optical axes of the lens 10 may be represented with two translational amounts $\Delta y$ and $\Delta z$ and two angular amounts $\Delta \theta_y$ and $\Delta \theta_z$ of the adjusted one of the two tetra-axis adjustment mechanisms.

Referring to FIGS. 4A through 4D, steps for measuring the decenter and tilt of a lens by using the lens measuring device with a single interferometer shown in FIG. 3 is shown therein.

Figure 4A:
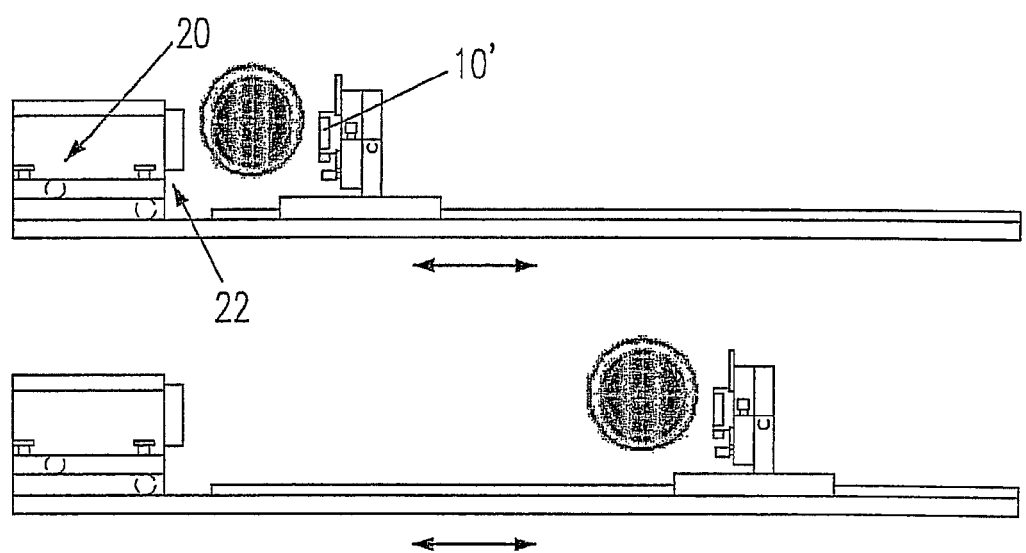
FIGS. 4A through 4D are diagrams for illustrating steps of measuring decenter and tilt amounts of the lens by using the lens measuring device shown in FIG. 3.
Figure 4B:
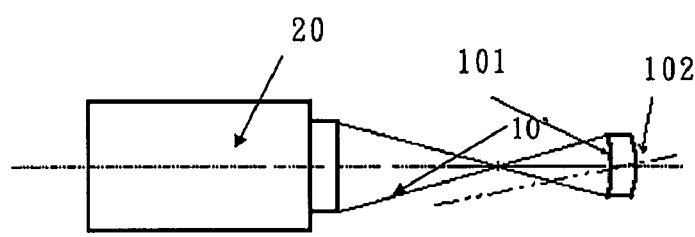
Figure 4C:
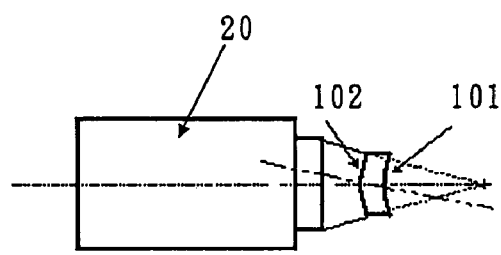
Figure 4D:
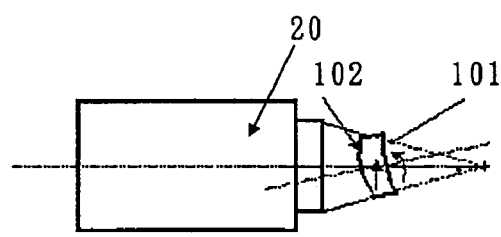

As shown in FIG. 4A, the lens measuring device 100 with a single interferometer is first provided and a standard planar lens 10' is provided on the lens holder 12 so that a calibrating process for the interferometer 20 may be done before the measuring process for a lens begins. In the calibrating process, the lens holder 12 is caused to move on the platen 40 backward and forward. If the same interfering fringes, which are parallel, are presented before and after the lens holder 12 and thus the standard planar lens 10' moves, it means that the interferometer 20 has been finished with the calibrating process with respect to the platen 40. Next, providing the lens 10 to be measured in place of the standard planar lens 10'. Then, the measuring process for the lens 10 may be launched. As shown in FIG. 4B, the optical axis of the interferometer 20 is made to coincide with the optical axis of the first surface of the lens 10 by operating the tetra-axis adjustment mechanism (not shown) on the lens holder 12. Next, the lens 10 is caused to overturn 180 degrees by using the 180 degree overturn mechanism described above. At this time, the second surface 102 faces the interferometer 20 (as shown in FIG. 4C). At the same time, the optical axis of the interferometer 20 still coincides with the optical axis of the first surface 101. Referring next to FIG. 4D, the optical axis of the second surface 102 is adjusted to coincide with the optical axis of the interferometer 20 by operating the tetra-axis adjustment mechanism on the lens holder 12. At this time, translational amounts $\Delta y$ and $\Delta z$ and adjusted angular amounts $\Delta \theta_y$ and $\Delta \theta_z$ of the tetra-axis adjustment mechanism in the Y and Z directions, respectively, required to move the optical axis of the second surface 102 from the original position when the optical axis of the first surface 101 to the final position when the optical axis of the second surface 102 coincides with the optical axis of the interferometer 20, are recorded. With the parameters of $\Delta y$, $\Delta z$, $\Delta \theta_y$ and $\Delta \theta_z$, the decenter and tilt amounts $\delta$ and $\theta$ existing between the first and second surfaces 101, 102 can be found, wherein $\delta = \sqrt{\delta_y^2 + \delta_z^2}$ and $\Delta \theta = \sqrt{\Delta \theta_y^2 + \Delta \theta_z^2}$.

Figure 5:
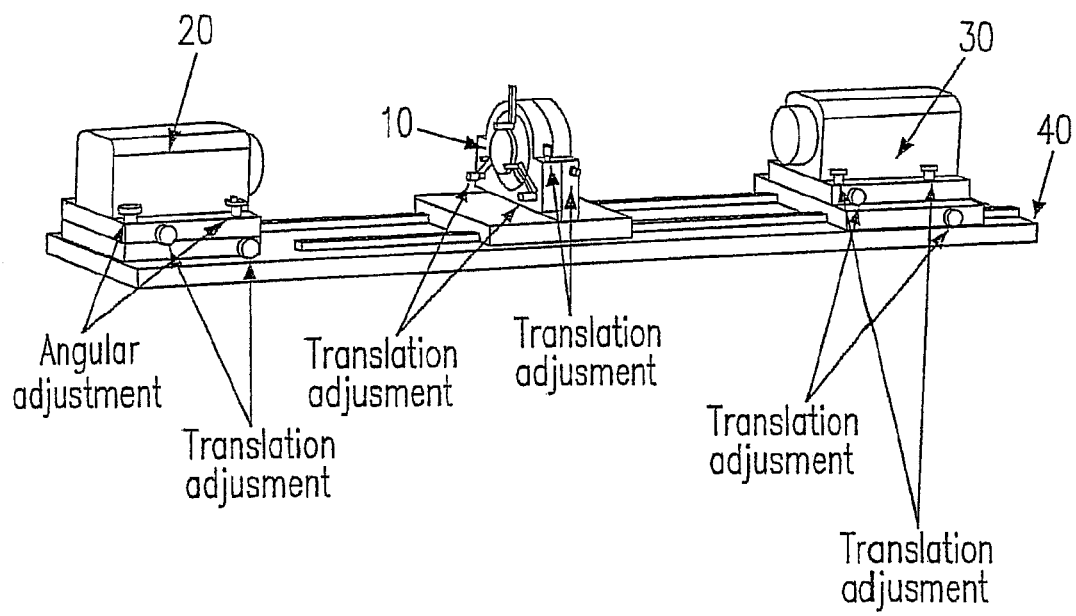
FIG. 5 is a diagram of a lens measuring device with dual interferometers according to a second embodiment of the present invention.

Referring to FIG. 5, a diagram of the lens measuring device with dual interferometers according to a second embodiment of the present invention is shown therein. The lens measuring device 200 is identical to the lens measuring device of the above embodiment except that a second interferometer 30 further included therein. The second interferometer 30 is also mounted on the platen 40 through an adjustment base 32. Similarly, the second interferometer 30 may also be adjusted in position, for measurement reason, with translational amounts $\Delta y$ and $\Delta z$ and adjusted angular amounts $\Delta \theta_y$ and $\Delta \theta_z$ in the Y and Z directions, respectively, of the adjustment base 32 involved. Further, the second interferometer 30 may also move forward and backward on the platen 40.

Figure 6A:
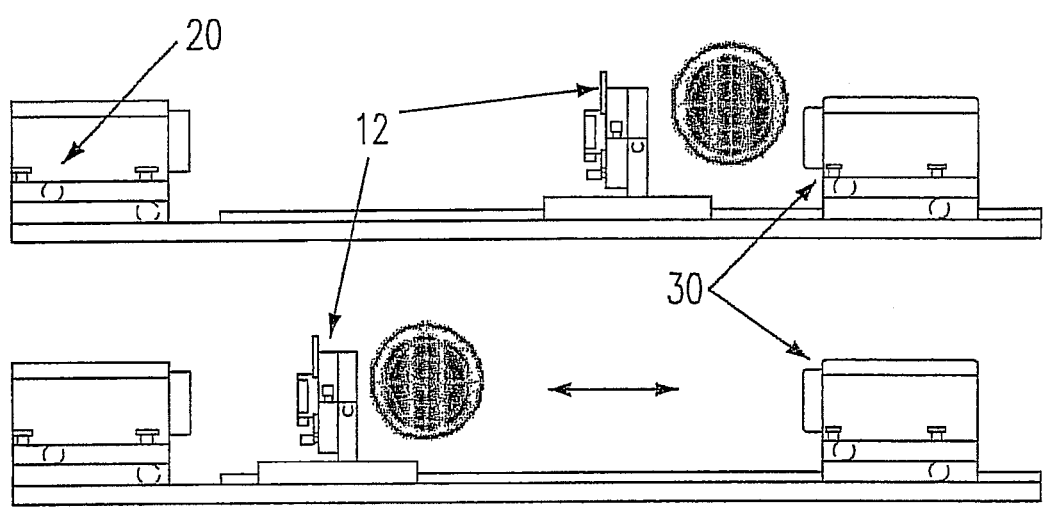
FIGS. 6A through FIG. 6C are diagrams for illustrating steps of measuring the decenter and tilt amounts of the lens by using the lens measuring device shown in FIG. 5.
Figure 6B:
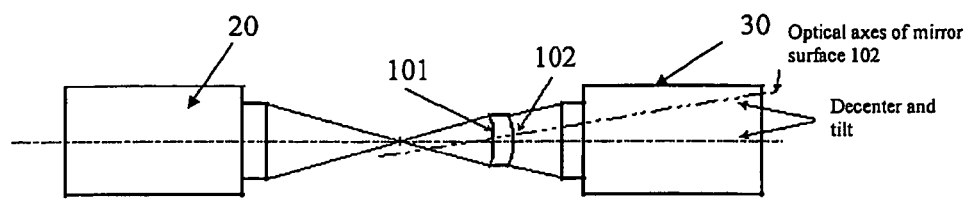
Figure 6C:
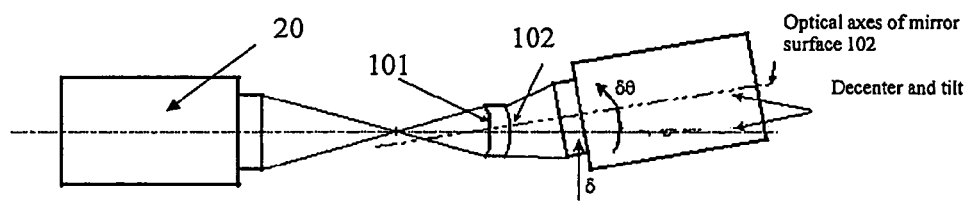
Figure 7A:
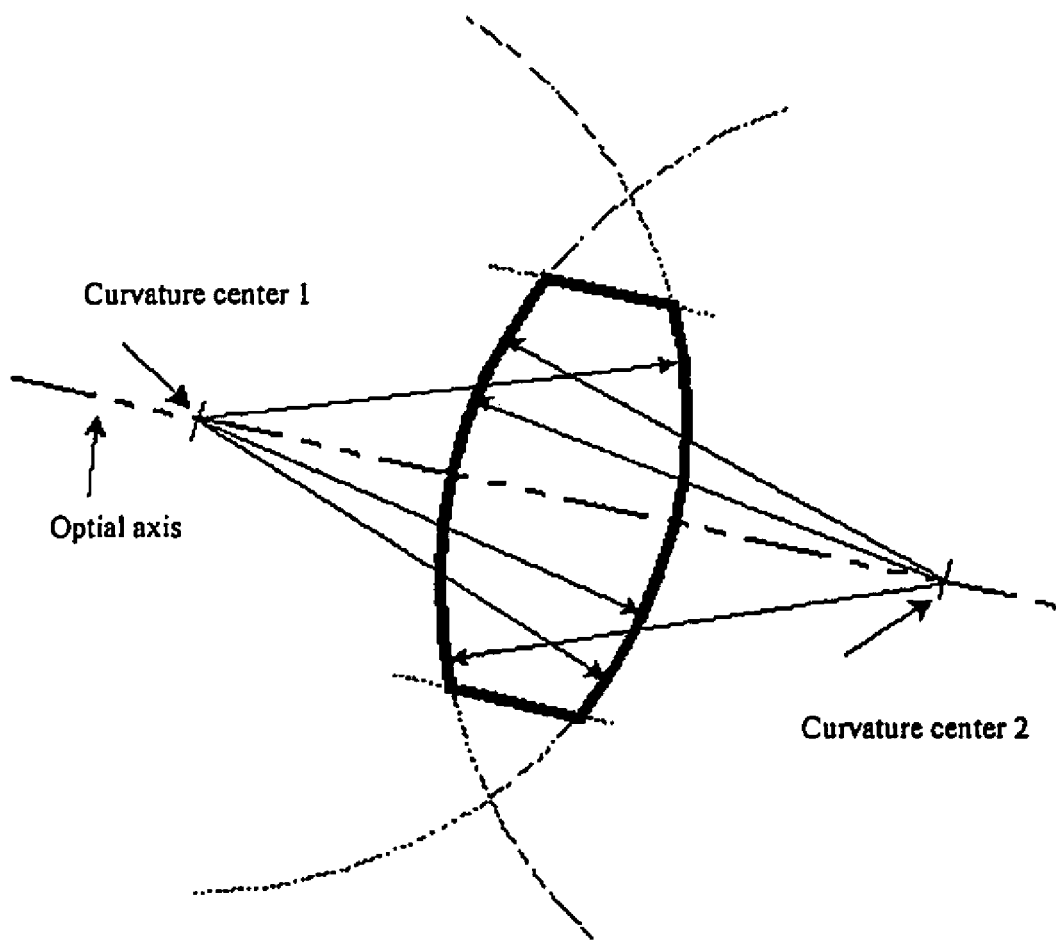
FIGS. 7A through 7E are diagrams for illustrating the decenter and tilt existing on the optical axes of the lens according to the present invention.
Figure 7B:
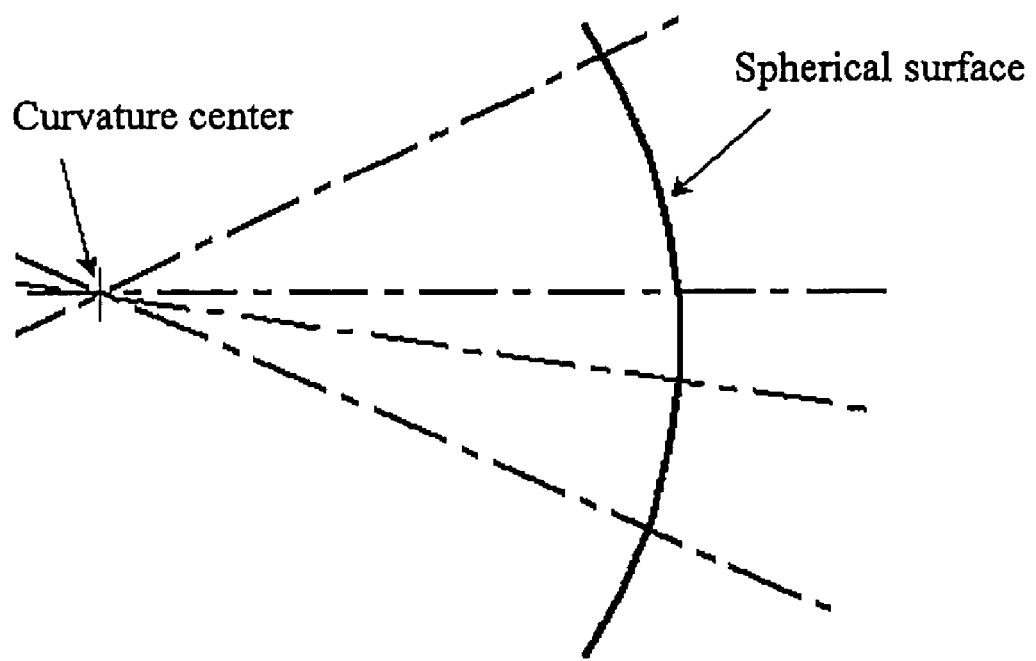
Figure 7C:
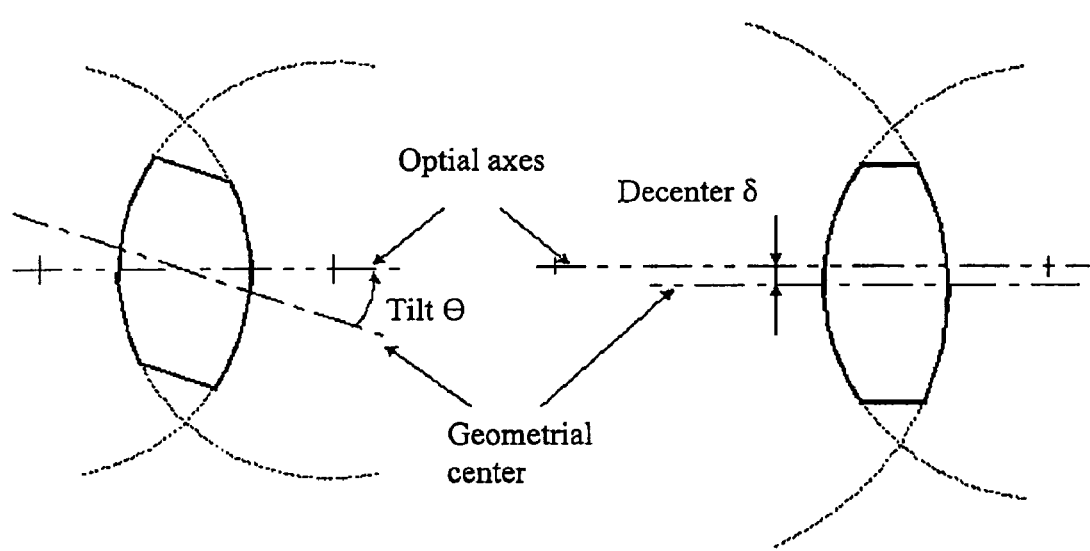
Figure 7D:
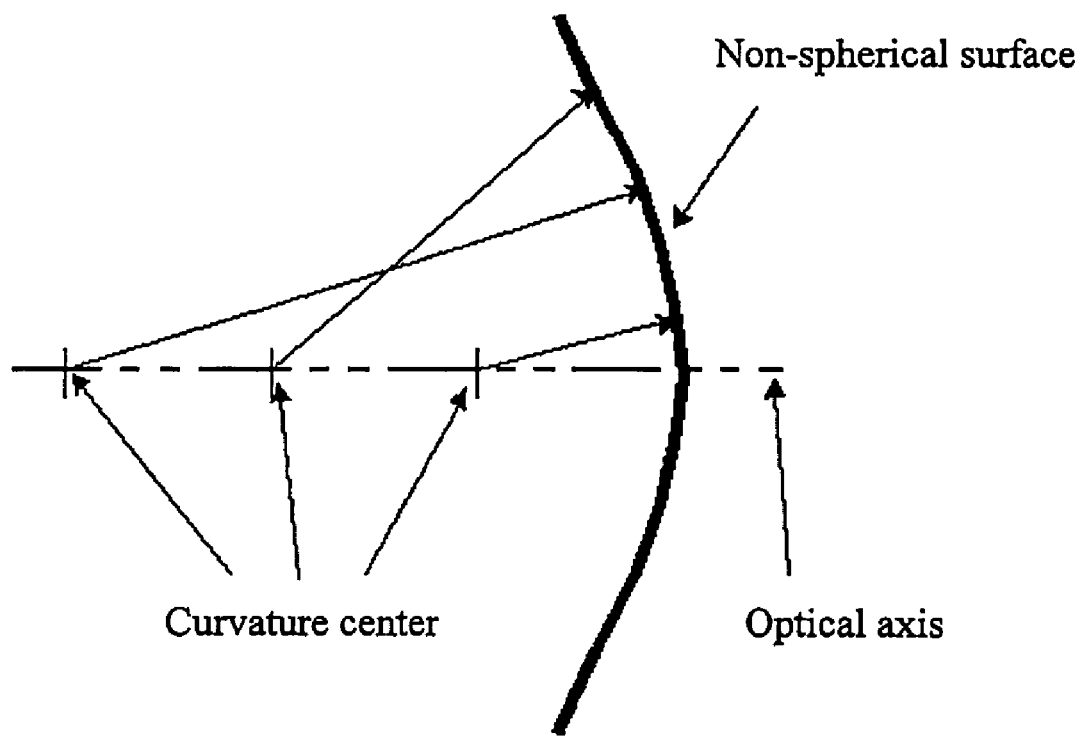
Figure 7E:
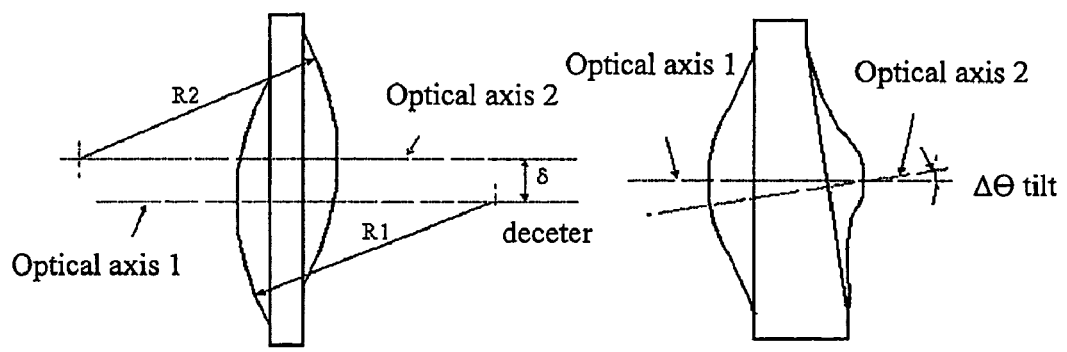

FIGS. 6A through FIG. 6C are diagrams for illustrating steps of measuring the decenter and tilt amounts of the lens by using the lens measuring device shown in FIG. 5.

At first, the lens measuring device having the two interferometers 200 shown in FIG. 5 is provided and a standard planar lens 10' is provided on the lens holder 12. As such, a calibrating process like that described with respect to FIG. 4A may be conducted. Namely, the first interferometer 20 is first calibrated with respect to the platen 40 with the second interferometer 30 being ignored. Then, the second interferometer 30 is calibrated with respect to the platen 40. In calibrating the second interferometer 30, the second interferometer 30 has to be translated and rotated, which have to be performed by operating the adjustment base 32. If the same interfering fringes, which are parallel, are presented before and after the standard planar lens 10' moves, it means that the interferometer 30 has been finished with the calibrating process with respect to the platen 40. At this time, it also means that the optical axes of the first and second interferometers 20, 30 coincide with each other. After the calibrating process, the lens 10 to be measured is provided in place of the standard planar lens 10' and then the measuring process for the decenter and tilt amounts of the lens is ready to be performed. As shown in FIG. 6B, the optical axis of the first surface 101 of the lens 10 to be measured is made to coincide with the optical axis of the first interferometer 20 by using the tetra-axis mechanism (not shown) on the lens holder 12. Next, referring to FIG. 4C where the optical axis of the lens 10 to be measured is made to coincide with the optical axis of the second interferometer 30 by using the adjustment base 32 associated with the second interferometer 30 or the tetra-axis mechanism (not shown) on the lens holder 12. At this time, translational amounts $\Delta y$ and $\Delta z$ and angular amounts $\Delta \theta_y$ and $\Delta \theta_z$ of the tetra-axis adjustment mechanism or the adjustment base 32 in the Y and Z directions, respectively, required to make the optical axis of the second surface 102 from the original position when the optical axis of the first surface 101 coincides with the optical axis of the first interferometer 20 to the final position when the optical axis of the second surface 102 coincides with the second interferometer 30, are recorded. With the parameters of $\Delta y$, $\Delta z$, $\Delta \theta_y$ and $\Delta \theta_z$, the decenter and tilt amounts δ and θ existing between the first and second surfaces 101, 102 can be found, wherein $\delta=\sqrt{\delta_y^2+\delta_z^2}$ and $\Delta\theta=\sqrt{\Delta\theta_y^2+\Delta\theta_z^2}$.

In the above embodiments, the decenter and tilt amounts of the lens are determined by making the optical axes of the lens coincide with the optical axis of the interferometer, which is served as a measurement basis. However, those skilled in the related art may also determine the decenter and tilt amounts of the lens by setting other measurement bases. In this regard, it is intended to cover various modifications and similar arrangements included within the spirit and scope of the appended claims which are to be accorded with the broadest interpretation so as to encompass all such modifications and similar structures.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A device for measuring a lens, comprising:
    a first interferometer having a first optical axis and carried on a first adjustment base;
    a lens holder for holding the lens having a first mirror surface having a first lens optical axis and a second mirror surface having a second lens optical axis, wherein the lens holder has a 180-degree overturn mechanism; and
    a platen having a sliding rail and carrying the first adjustment base and the lens holder thereon, wherein the lens holder is movable on the sliding rail,
    wherein each of the first adjustment base and the lens holder has a tetra-axis adjustment mechanism through which a relative positional relationship of the first optical axis of the first interferometer and the first lens optical axis of the first mirror surface of the lens is adjustable.

2. The device as claimed in claim 1, wherein the tetra-axis adjustment mechanism comprises two translation axes and two rotation axes.

3. The device as claimed in claim 1, wherein the first and second lens optical axes of the first and second mirror surfaces are calibrated in turn with respect to the first optical axis of the first interferometer by using the 180-degree overturn mechanism.

4. The device as claimed in claim 1, further comprising a second interferometer having a second lens optical axis and disposed on a second adjustment base on the platen to measure a relative positional relationship of the second lens optical axis of the second mirror surface and the second optical axis of the second interferometer.

5. A method for measuring a decenter amount and a tilt amount of a lens, comprising the steps of:
    providing an interferometer having an optical axis and the lens, wherein the lens has a first lens optical axis and a second lens optical axis;
    arranging the optical axis of the interferometer and the first lens optical axis of the first mirror surface into having a first specific relative positional relationship therebetween;
    rotating the lens by 180-degree around an axis perpendicular to the optical axis of the interferometer;
    adjusting the second optical axis of the lens and the optical axis of the interferometer into having a second specific relationship therebetween and recording a first adjusted translation amount Δy, a second adjusted translation amount Δz, a first adjusted angular amount Δθy and a second adjusted angular amount Δθz required to be adjusted; and
    calculating the respective one of the decenter amount δ and the tilt amount Δθ existing between the first and second lens optical axes according to the first and second adjusted translation amounts Δy and Δz and the first and second adjusted angular amounts Δθy and Δθz.

6. The method as claimed in claim 5, wherein each of the first and second specific relationships is a relationship where the optical axis of the interferometer and the first and second lens optical axes of the first and second mirror surfaces totally coincide with each other.

7. The method as claimed in claim 6, wherein the optical axis of the interferometer and the first and second lens optical axes of the first and second mirror surfaces are adjusted to totally coincide with one another by observing interfering bands formed as an interfering graph on the lens.

8. The method as claimed in claim 7, wherein a distance between the lens and the interferometer is adjusted to present the interfering bands on the lens to the interferometer.

9. The method as claimed in claim 7, wherein the optical axis of the interferometer and the first and second lens optical axes of the lens are adjusted to totally coincide with one another by observing whether the interfering bands are formed as concentric rings and whether the concentric rings are positioned at a center of the interfering graph.

10. The method as claimed in claim 5, wherein the first and second specific relationships are identical to each other.

11. A method for measuring a decenter amount and a tilt amount of a lens, comprising the steps of:
    providing a first interferometer having a first optical axis, a second interferometer having a second optical axis and the lens, wherein the lens has a first mirror surface having a first lens optical axis and a second mirror surface having a second lens optical axis, and the first and second interferometers face the first and second mirror surfaces of the lens respectively;
    adjusting the second interferometer and the lens so that the second lens optical axis of the second mirror surface and the second optical axis of the second interferometer have a second specific relative positional relationship therebetween;
    adjusting the second lens optical axis of the second mirror surface of the lens and the second optical axis of the second interferometer into having a second specific relative positional relationship therebetween and recording a first adjusted translation amount Δy, a second adjusted translation amount Δz, a first adjusted angular amount Δθy and a second adjusted angular amount Δθz; and
    calculating the decenter amount δ and the tilt amount Δθ existing between the first and second lens optical axes of the first and second mirror surfaces according to the first and second specific relative positional relationships and the first and second adjusted translation amounts Δy and Δz and the first and second adjusted angular amounts Δθy and Δθz.

12. The method as claimed in claim 11, wherein each of the first and second specific relationships is a relationship where the first and second optical axes of the first and second interferometers and the first and second lens optical axes of the first and second mirror surfaces totally coincide with one another.

13. The method as claimed in claim 12, wherein the optical axes of the first and second interferometers and the first and second lens optical axes of the first and second mirror surfaces are adjusted to totally coincide with one another by observing interfering bands forming an interfering graph on the lens.

14. The method as claimed in claim 13, wherein a first distance between the lens and the first interferometer and a second distance between the lens and the second interferometer are adjusted respectively to present the interfering graph on the lens to the interferometer.

15. The method as claimed in claim 13, wherein the optical axes of the first and second interferometers and the first and second lens optical axes of the first and second mirror surfaces are adjusted to totally coincide with one another by observing whether the interfering bands are formed as concentric rings and whether the concentric rings are positioned at a center of the interfering graph.

16. The method as claimed in claim 11, wherein the first and second specific relationships are identical to each other.

* * * * *